United States Patent
Yang et al.

(10) Patent No.: US 10,757,639 B2
(45) Date of Patent: Aug. 25, 2020

(54) WI-FI HOTSPOT RECOMMENDATION METHOD, TERMINAL, AND GRAPHICAL USER INTERFACE

(71) Applicant: HUAWEI TECHNOLOGIES CO., LTD., Shenzhen (CN)

(72) Inventors: Yuxin Yang, Shenzhen (CN); Wang Chen, Shenzhen (CN); Ti-Yu Wu, Taipei (TW); Te-Chin Chang, Taipei (TW); Xiuping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/090,249

(22) PCT Filed: Mar. 30, 2016

(86) PCT No.: PCT/CN2016/077890
§ 371 (c)(1),
(2) Date: Sep. 30, 2018

(87) PCT Pub. No.: WO2017/166131
PCT Pub. Date: Oct. 5, 2017

(65) Prior Publication Data
US 2019/0116550 A1    Apr. 18, 2019

(51) Int. Cl.
*H04W 84/12*   (2009.01)
*H04W 24/10*   (2009.01)
(Continued)

(52) U.S. Cl.
CPC ......... *H04W 48/16* (2013.01); *H04L 61/2015* (2013.01); *H04W 12/06* (2013.01);
(Continued)

(58) Field of Classification Search
CPC ... H04W 48/16; H04W 48/18; H04W 72/085; H04W 28/0242; H04W 28/0273;
(Continued)

(56) References Cited

U.S. PATENT DOCUMENTS 8,818,260 B2 *   8/2014   Gaines ................. H04W 48/18
                                                                455/11.1
9,113,495 B1    8/2015   Boyle et al.
(Continued)

FOREIGN PATENT DOCUMENTS

CN    101765186 A    6/2010
CN    103415061 A    11/2013
(Continued)

*Primary Examiner* — Mohamed A Kamara
(74) *Attorney, Agent, or Firm* — Kilpatrick Townsend & Stockton LLP

(57) ABSTRACT

The present invention relates to the communications field, and discloses a Wi-Fi hotspot recommendation method, a terminal, and a graphical user interface, so as to resolve a problem that a Wi-Fi hotspot selected by a user according to information such as an RSSI is not necessarily a Wi-Fi hotspot with optimal Internet surfing experience in an area in which the user is located. A specific solution is as follows: A terminal scans a Wi-Fi hotspot; determines an Internet-accessible hotspot in Wi-Fi hotspots that are obtained by means of scanning; determines network quality obtained when the terminal accesses a network by using the Internet-accessible hotspot; and displays an identifier of the Internet-accessible hotspot and an identifier that indicates the network quality obtained when the terminal accesses the network by using the Internet-accessible hotspot. The present invention is applied to a Wi-Fi hotspot recommendation process.

17 Claims, 9 Drawing Sheets

(51) Int. Cl.
*H04W 48/16* (2009.01)
*H04W 48/20* (2009.01)
*H04L 29/12* (2006.01)
*H04W 12/06* (2009.01)
*H04W 28/02* (2009.01)
*H04W 72/08* (2009.01)

(52) U.S. Cl.
CPC ... *H04W 28/0242* (2013.01); *H04W 28/0273* (2013.01); *H04W 48/20* (2013.01); *H04W 72/085* (2013.01); *H04W 24/10* (2013.01); *H04W 84/12* (2013.01)

(58) Field of Classification Search
CPC ..... H04W 12/06; H04W 48/20; H04W 24/10; H04W 84/12; H04L 61/2015
See application file for complete search history.

(56) References Cited

U.S. PATENT DOCUMENTS

| | | |
|---|---|---|
| 2007/0167174 A1 | 7/2007 | Halcrow et al. |
| 2010/0124213 A1 | 5/2010 | Ise et al. |
| 2012/0257536 A1 | 10/2012 | Kholaif et al. |
| 2013/0223340 A1 | 8/2013 | Jeong |
| 2014/0079022 A1 | 3/2014 | Wang et al. |
| 2015/0146706 A1* | 5/2015 | Goluboff .............. H04W 76/10 370/338 |
| 2015/0264597 A1* | 9/2015 | Zhang .................. H04W 36/14 370/232 |
| 2016/0105846 A1* | 4/2016 | Anderson ............. H04W 48/20 370/338 |
| 2016/0242107 A1 | 8/2016 | Yang et al. |
| 2016/0254973 A1* | 9/2016 | Joanny .................. H04L 43/08 370/241 |
| 2017/0013549 A1* | 1/2017 | Ou ........................ H04W 48/16 |
| 2017/0063657 A1 | 3/2017 | Wang et al. |
| 2017/0094054 A1* | 3/2017 | Li ....................... H04L 61/6068 |
| 2017/0318614 A1 | 11/2017 | Wang et al. |
| 2017/0374552 A1* | 12/2017 | Xia ....................... H04W 48/20 |

FOREIGN PATENT DOCUMENTS

| | | |
|---|---|---|
| CN | 103796280 A | 5/2014 |
| CN | 103987081 A | 8/2014 |
| CN | 104301925 A | 1/2015 |
| CN | 104507113 A | 4/2015 |
| CN | 104768156 A | 7/2015 |
| CN | 105142234 A | 12/2015 |
| CN | 105228227 A | 1/2016 |
| EP | 2346211 A2 | 7/2011 |
| JP | 2010124048 A | 6/2010 |
| JP | 2014179719 A | 9/2014 |
| JP | 2015508614 A | 3/2015 |
| KR | 20150034496 A | 4/2015 |
| WO | 2017035997 A1 | 3/2017 |

* cited by examiner

WI-FI HOTSPOT RECOMMENDATION METHOD, TERMINAL, AND GRAPHICAL USER INTERFACE

CROSS-REFERENCE TO RELATED APPLICATIONS

This application is a National Stage of International Application No. PCT/CN2016/077890, filed on Mar. 30, 2016, which is hereby incorporated by reference in its entirety.

TECHNICAL FIELD

The present invention relates to the communications field, and in particular, to a Wi-Fi hotspot recommendation method, a terminal, and a graphical user interface.

BACKGROUND

With continuous development of communications technologies, a mobile communications terminal such as a smartphone becomes more popular. To help a user use the mobile communications terminal to connect to a wireless local area network (English: Wireless Local Area Network, WLAN for short) for Internet surfing, more and more Wireless Fidelity (English: Wireless Fidelity, Wi-Fi for short) hotspots are being deployed in many public places such as an airport and a restaurant. A specific process in which the user uses the mobile communications terminal to connect to the WLAN for Internet surfing is as follows: After the user enters a public place, when a WLAN function of the terminal is enabled, the terminal may scan all Wi-Fi hotspots in the area, and present all the Wi-Fi hotspots obtained by means of scanning to the user. In this case, the user may select a Wi-Fi hotspot for connection, so that the user surfs the Internet by using the Wi-Fi hotspot.

In the prior art, a scanning result presented by the terminal to the user includes information about each Wi-Fi hotspot, such as a name, an encryption scheme, and a received signal strength indicator (English: Received Signal Strength Indicator, RSSI for short), so that the user selects, according to the information, a Wi-Fi hotspot with optimal Internet surfing experience for connection. However, the information such as the RSSI cannot reflect real Internet surfing quality of a Wi-Fi hotspot. That is, the Wi-Fi hotspot selected by the user according to the information is not necessarily a Wi-Fi hotspot with optimal Internet surfing experience in the area in which the user is located, and consequently, user experience is affected.

Therefore, how to help a user select a Wi-Fi hotspot with optimal Internet surfing experience is an important topic studied by a person skilled in the art.

SUMMARY

The present invention provides a Wi-Fi hotspot recommendation method, a terminal, and a graphical user interface, so as to resolve a problem that a Wi-Fi hotspot selected by a user according to information such as an RSSI is not necessarily a Wi-Fi hotspot with optimal Internet surfing experience in an area in which the user is located.

To achieve the foregoing objective, the following technical solutions are used in the present invention:

According to a first aspect of the present invention, a Wireless Fidelity Wi-Fi hotspot recommendation method is provided, including:

when a user enters an area, and a WLAN function of a terminal of the user is enabled, the terminal may scan a Wi-Fi hotspot in the area to obtain all Wi-Fi hotspots by means of scanning; then select, from all the Wi-Fi hotspots obtained by means of scanning, an Internet-accessible hotspot in which the terminal can normally access the Internet after being connected to the Internet-accessible hotspot, and determine network quality obtained when the terminal accesses a network by using the Internet-accessible hotspot; and finally display an identifier of the Internet-accessible hotspot and an identifier that indicates the network quality obtained when the terminal accesses the network by using the Internet-accessible hotspot.

According to the Wi-Fi hotspot recommendation method provided in this embodiment of the present invention, the terminal scans the Wi-Fi hotspot in the area in which the terminal is located to obtain all the Wi-Fi hotspots in the area; then determines the Internet-accessible hotspot from the Wi-Fi hotspots obtained by means of scanning, and determines the network quality obtained when the terminal accesses the network by using the Internet-accessible hotspot; and finally displays the identifier of the Internet-accessible hotspot and the identifier that indicates the determined network quality obtained when the terminal accesses the network by using the Internet-accessible hotspot. In this way, when opening a WLAN setting page of the terminal, the user may view real Internet surfing experience obtained when the network is accessed by using the Wi-Fi hotspot, and further select a Wi-Fi hotspot with optimal Internet surfing experience from displayed Wi-Fi hotspots for connection, thereby improving user experience.

With reference to the first aspect, in a possible implementation, an authentication hotspot that is in the Wi-Fi hotspots obtained by means of scanning and in which the terminal can normally access the Internet only by performing login authentication after being connected to the authentication hotspot may be determined, so that the authentication hotspot in the Wi-Fi hotspots that are obtained by means of scanning can be marked, and the authentication hotspot can be warned.

The terminal may determine, by performing the following steps, the authentication hotspot in the Wi-Fi hotspots that are obtained by means of scanning: connecting to, by the terminal, the Wi-Fi hotspot obtained by means of scanning, receiving a response code (English: HTTP response code) returned by the Wi-Fi hotspot, and if determining that the response code is a second response code, determining that the Wi-Fi hotspot is the authentication hotspot.

With reference to the first aspect, or the foregoing possible implementation, in another possible implementation, for each of the Wi-Fi hotspots that are obtained by means of scanning, the terminal may determine, by performing the following steps, the Internet-accessible hotspot in the Wi-Fi hotspots that are obtained by means of scanning: connecting to, by the terminal, the Wi-Fi hotspot obtained by means of scanning, receiving a response code returned by the Wi-Fi hotspot, and determining, if determining that the response code is a first response code, that the Wi-Fi hotspot is the Internet-accessible hotspot.

With reference to the first aspect, or the foregoing possible implementations, in another possible implementation, before the terminal is connected to the Wi-Fi hotspot obtained by means of scanning, the terminal may filter out a Wi-Fi hotspot that is in the Wi-Fi hotspots obtained by means of scanning and that can be associated only by means of manual authentication of the user. That is, the terminal may determine a target Wi-Fi hotspot in the Wi-Fi hotspots obtained by means of scanning, where the target Wi-Fi hotspot includes at least one of a Wi-Fi hotspot whose identification information is stored in the terminal or an open Wi-Fi hotspot that does not need to be identified.

In this case, the connecting to the Wi-Fi hotspot obtained by means of scanning may specifically include: connecting to the target Wi-Fi hotspot. The receiving a response code returned by the Wi-Fi hotspot may specifically include: receiving a response code returned by the target Wi-Fi hotspot. The determining, if the response code is a first response code, that the Wi-Fi hotspot is the Internet-accessible hotspot may specifically include: if the response code is the first response code, determining that the target Wi-Fi hotspot is the Internet-accessible hotspot.

Certainly, before connecting to the Wi-Fi hotspot obtained by means of scanning, when the terminal performs the operation of filtering out a Wi-Fi hotspot that is in the Wi-Fi hotspots obtained by means of scanning and that can be associated only by means of manual authentication of the user, the terminal may determine, by performing the following steps, the authentication hotspot in the Wi-Fi hotspots that are obtained by means of scanning: connecting to, by the terminal, the target Wi-Fi hotspot, receiving a response code returned by the target Wi-Fi hotspot, and if determining that the response code is the second response code, determining that the target Wi-Fi hotspot is the authentication hotspot.

With reference to the first aspect, or the foregoing possible implementations, in another possible implementation, the terminal may determine, by performing the following steps, the network quality obtained when the terminal accesses the network by using the Internet-accessible hotspot: connecting to, by the terminal, the Internet-accessible hotspot, and sending a network data loading request to the Internet-accessible hotspot. After receiving the network data loading request, the Internet-accessible hotspot returns network data. In this case, the terminal may obtain the returned network data corresponding to the network data loading request, and collect a data loading parameter in a network data loading process, where the data loading parameter includes at least one piece of Transmission Control Protocol (English: Transmission Control Protocol, TCP for short) data or Wi-Fi over the air (English: Over the Air, OTA for short) data. Then, the terminal may determine, according to the data loading parameter and a preset rating condition, the network quality obtained when the terminal accesses the network by using the Internet-accessible hotspot.

It should be noted that the rating condition may be set according to a requirement in an actual application scenario. This is not specifically limited in the present invention.

With reference to the first aspect, or the foregoing possible implementations, in another possible implementation, the terminal may determine an Internet-inaccessible hotspot that is in the Wi-Fi hotspots obtained by means of scanning and in which the terminal cannot normally access the Internet after being connected to the Internet-inaccessible hotspot, so that the Internet-inaccessible hotspot in the Wi-Fi hotspots that are obtained by means of scanning can be marked, and the Internet-inaccessible hotspot can be warned.

The terminal may determine, by performing the following steps, the Internet-inaccessible hotspot in the Wi-Fi hotspots that are obtained by means of scanning: connecting to, by the terminal, the Wi-Fi hotspot obtained by means of scanning, receiving a response code returned by the Wi-Fi hotspot, and if determining that the response code is a third response code, determining that the Wi-Fi hotspot is the Internet-inaccessible hotspot; or connecting to, by the terminal, the Wi-Fi hotspot obtained by means of scanning, and if determining that a response code returned by the Wi-Fi hotspot is not received, determining, by the terminal, that the Wi-Fi hotspot is the Internet-inaccessible hotspot.

Certainly, before connecting to the Wi-Fi hotspot obtained by means of scanning, when the terminal performs the operation of filtering out a Wi-Fi hotspot that is in the Wi-Fi hotspots obtained by means of scanning and that can be associated only by means of manual authentication of the user, the terminal may determine, by performing the following steps, the Internet-inaccessible hotspot in the Wi-Fi hotspots that are obtained by means of scanning: connecting to, by the terminal, the target Wi-Fi hotspot, receiving a response code returned by the target Wi-Fi hotspot, and if determining that the response code is the third response code, determining that the target Wi-Fi hotspot is the Internet-inaccessible hotspot; or connecting to, by the terminal, the target Wi-Fi hotspot, and if determining that a response code returned by the target Wi-Fi hotspot is not received, determining, by the terminal, that the target Wi-Fi hotspot is the Internet-inaccessible hotspot.

With reference to the first aspect, or the foregoing possible implementations, in another possible implementation, the terminal may determine a network congestion hotspot that is in the Wi-Fi hotspots obtained by means of scanning and that cannot be successfully connected, or a network congestion hotspot in which the accessed Internet is in jitter after the network congestion hotspot is connected, so that the network congestion hotspot in the Wi-Fi hotspots that are obtained by means of scanning can be marked, and the network congestion hotspot can be warned.

The terminal may determine, by performing the following step, the network congestion hotspot in the Wi-Fi hotspots that are obtained by means of scanning: if the terminal determines that the terminal is not successfully connected to the Wi-Fi hotspot obtained by means of scanning, determining, by the terminal, that the Wi-Fi hotspot is the network congestion hotspot.

Certainly, before connecting to the Wi-Fi hotspot obtained by means of scanning, when the terminal performs the operation of filtering out a Wi-Fi hotspot that is in the Wi-Fi hotspots obtained by means of scanning and that can be associated only by means of manual authentication of the user, the terminal may determine, by performing the following step, the network congestion hotspot in the Wi-Fi hotspots that are obtained by means of scanning: if the terminal determines that the terminal is not successfully connected to the target Wi-Fi hotspot, determining, by the terminal, that the target Wi-Fi hotspot is the network congestion hotspot.

With reference to the first aspect, or the foregoing possible implementations, in another possible implementation, after connecting to the Wi-Fi hotspot, the terminal may further determine to retain a default routing network port of the terminal, so that the user and a third-party application can be prevented from sensing a process in which the terminal detects a network type and network quality of the Wi-Fi hotspot.

With reference to the first aspect, or the foregoing possible implementations, in another possible implementation, after connecting to the Wi-Fi hotspot, the terminal may further determine not to present a state in which the terminal is connected to the Wi-Fi hotspot, so that the user and the third-party application can be prevented from sensing the state in which the terminal is connected to the Wi-Fi hotspot.

With reference to the first aspect, or the foregoing possible implementations, in another possible implementation, to increase a speed of connecting to a Wi-Fi hotspot by the terminal, preferably, the Wi-Fi hotspot may be connected by performing the following processes:

if the terminal has been connected to the Wi-Fi hotspot before performing the following process, saving, by the terminal, Internet Protocol (English: Internet Protocol, IP for short) configuration information that is dynamically allocated when the terminal is connected to the Wi-Fi hotspot;

determining, by the terminal, whether IP configuration information required for connecting to the Wi-Fi hotspot is stored, and when the IP configuration information exists, connecting to the Wi-Fi hotspot according to the IP configuration information.

With reference to the first aspect, or the foregoing possible implementations, in another possible implementation, the method further includes:

when the IP configuration information does not exist, it indicates that the terminal has not been connected to the Wi-Fi hotspot before, and in this case, the terminal may obtain the IP configuration information by performing a Dynamic Host Configuration Protocol (English: Dynamic host configuration protocol, DHCP for short) operation, save the IP configuration information for a next connection, and connect to the Wi-Fi hotspot according to the IP configuration information.

According to a second aspect of the present invention, a terminal is provided and includes:

a scanning unit, configured to scan a Wi-Fi hotspot;

a determining unit, configured to: determine an Internet-accessible hotspot in Wi-Fi hotspots that are obtained by the scanning unit by means of scanning, and determine network quality obtained when the terminal accesses a network by using the Internet-accessible hotspot; and a display unit, configured to display an identifier of the Internet-accessible hotspot and an identifier that indicates the network quality obtained when the terminal accesses the network by using the Internet-accessible hotspot.

For a specific implementation, refer to an operation and a function of the terminal in the Wi-Fi hotspot recommendation method provided in the first aspect, or the possible implementations of the first aspect.

According to a third aspect of the present invention, a terminal is provided and includes: at least one processor, a display, a memory, and a Wi-Fi module.

The memory is configured to store an instruction.

The Wi-Fi module is configured to scan a Wi-Fi hotspot.

The processor is configured to perform the Wi-Fi hotspot recommendation method provided in the first aspect, or the possible implementations of the first aspect, so as to implement a function of the determining unit in the second aspect.

The display is configured to perform the Wi-Fi hotspot recommendation method provided in the first aspect, or the possible implementations of the first aspect, so as to implement a function of the display unit in the second aspect.

According to a fourth aspect of the present invention, a graphical user interface on a terminal is provided. The terminal includes a Wi-Fi module, a display, a memory, and at least one processor for executing an instruction stored in the memory. The graphical user interface includes:

an identifier of an Internet-accessible hotspot and an identifier that indicates network quality obtained when the terminal accesses a network by using the Internet-accessible hotspot.

In response to a determined Internet-accessible hotspot in Wireless Fidelity Wi-Fi hotspots that are obtained by means of scanning, an identifier of the Internet-accessible hotspot is displayed.

In response to determined network quality obtained when the terminal accesses a network by using the Internet-accessible hotspot, an identifier of the network quality is displayed.

With reference to the fourth aspect, in a possible implementation, the graphical user interface further includes:

a network type of the Internet-accessible hotspot.

The network type of the Internet-accessible hotspot is Internet accessibility, and in response to the determined network type of the Internet-accessible hotspot, the network type of the Internet-accessible hotspot is displayed.

With reference to the fourth aspect, or the foregoing possible implementation, in another possible implementation, the graphical user interface further includes:

an identifier of an authentication hotspot and a network type of the authentication hotspot.

The network type of the authentication hotspot is login authentication required.

In response to a determined authentication hotspot in the Wi-Fi hotspots that are obtained by means of scanning, an identifier of the authentication hotspot is displayed.

In response to a determined network type of the authentication hotspot, the network type of the authentication hotspot is displayed.

With reference to the fourth aspect, or the foregoing possible implementations, in another possible implementation, the graphical user interface further includes:

an identifier of an Internet-inaccessible hotspot and a network type of the Internet-inaccessible hotspot.

The network type of the Internet-inaccessible hotspot is Internet inaccessibility.

In response to a determined Internet-inaccessible hotspot in the Wi-Fi hotspots that are obtained by means of scanning, an identifier of the Internet-inaccessible hotspot is displayed.

In response to a determined network type of the Internet-inaccessible hotspot, the network type of the Internet-inaccessible hotspot is displayed.

With reference to the fourth aspect, or the foregoing possible implementations, in another possible implementation, the graphical user interface further includes:

an identifier of a network congestion hotspot and a network type of the network congestion hotspot.

The network type of the network congestion hotspot is network congestion.

In response to a determined network congestion hotspot in the Wi-Fi hotspots that are obtained by means of scanning, an identifier of the network congestion hotspot is displayed.

In response to a determined network type of the network congestion hotspot, the network type of the network congestion hotspot is displayed.

According to the graphical user interface provided in this embodiment of the present invention, the identifier of the Internet-accessible hotspot and the identifier that indicates the determined network quality obtained when the terminal accesses the network by using the Internet-accessible hotspot are displayed. In this way, when opening a WLAN setting page of the terminal, the user may view real Internet surfing experience obtained when the network is accessed by using the Wi-Fi hotspot, and further select a Wi-Fi hotspot with optimal Internet surfing experience from displayed Wi-Fi hotspots for connection, thereby improving user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A basic principle of the present invention is as follows: After a terminal enters an area (such as an airport), when a WLAN function of the terminal is enabled, the terminal may scan a Wi-Fi hotspot in the area to obtain all Wi-Fi hotspots in the area; then determine an Internet-accessible hotspot from all the Wi-Fi hotspots obtained by means of scanning, and determine network quality obtained when the terminal accesses a network by using the Internet-accessible hotspot; and finally display an identifier of the Internet-accessible hotspot and an identifier that indicates the determined network quality obtained when the terminal accesses the network by using the Internet-accessible hotspot. In this way, when opening a WLAN setting page of the terminal, a user may view not only an RSSI of a Wi-Fi hotspot but also network quality obtained when the network is accessed by using the Wi-Fi hotspot. Therefore, the user may select, according to the network quality obtained when the network is accessed by using the Wi-Fi hotspot, a Wi-Fi hotspot with optimal Internet surfing experience from displayed Wi-Fi hotspots for connection, thereby improving user experience.

In the present invention, the network quality obtained when the terminal accesses the network by using the Internet-accessible hotspot may be quality evaluation (English: Quality of Estimate, QoE for short) comprehensively determined according to a network throughput rate, a packet loss rate, a delay, a jitter, a congestion degree, and the like that are obtained when the terminal accesses the network by using the Internet-accessible hotspot.

The following describes implementations of the present invention in detail with reference to the accompanying drawings.

Figure 1:
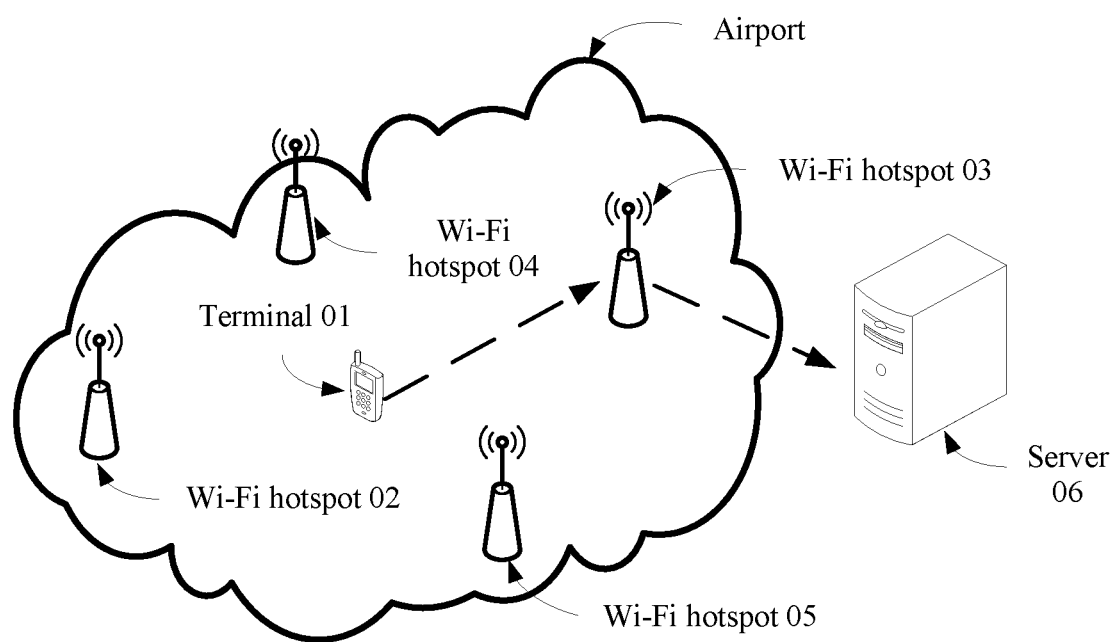
FIG. 1 is a schematic diagram of a network architecture to which the present invention is applied according to an embodiment of the present invention.

As shown in FIG. 1, FIG. 1 is a simplified schematic diagram of a network architecture to which the present invention can be applied. The network architecture may include a terminal 01, at least one Wi-Fi hotspot 02, and a server 06.

The terminal 01 may be a mobile phone, a tablet computer, a notebook computer, an ultra-mobile personal computer (English: Ultra-mobile Personal Computer, UMPC for short), a netbook, a personal digital assistant (English: Personal Digital Assistant, PDA for short), or the like.

When the network architecture includes at least two Wi-Fi hotspots, the at least two Wi-Fi hotspots are located in one public area. In specific implementation, in an embodiment, for example, as shown in FIG. 1, four Wi-Fi hotspots: a Wi-Fi hotspot 02, a Wi-Fi hotspot 03, a Wi-Fi hotspot 04, and a Wi-Fi hotspot 05 are set in an airport. In addition, a quantity of Wi-Fi hotspots set in the public area is not specifically limited in the present invention.

The terminal 01 may access the server 06 by using any Wi-Fi hotspot. In specific implementation, in an embodiment, for example, as shown in FIG. 1, the terminal 01 accesses the server 06 by using the Wi-Fi hotspot 03.

The server 06 is mainly configured to return, to the terminal 01, information corresponding to a request of the terminal 01.

It should be noted that, in this embodiment of the present invention, a terminal quantity, a Wi-Fi hotspot quantity, and a server quantity in FIG. 1 are merely examples. There may be any quantity of terminals, Wi-Fi hotspots, and servers according to an actual application scenario.

Figure 2:
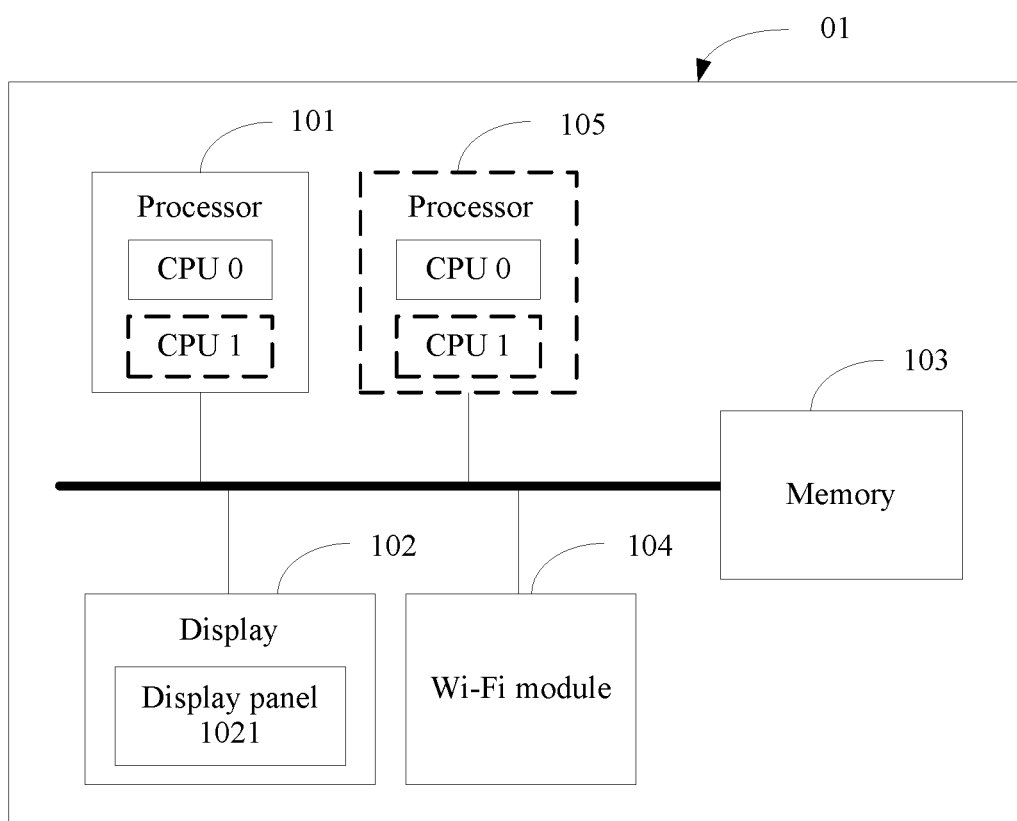
FIG. 2 is a schematic diagram of composition of a terminal according to an embodiment of the present invention.

As shown in FIG. 2, the terminal 01 shown in FIG. 1 may include at least one processor 101, a display 102, a memory 103, and a Wi-Fi module 104.

The following describes the components of the terminal 01 in detail with reference to FIG. 2.

The processor 101 is a control center of the terminal 01, and may be one processor, or may be a general name of multiple processing elements. For example, the processor 101 is a central processing unit (English: central processing unit, CPU for short), may be an application-specific integrated circuit (English: Application Specific Integrated Circuit, ASIC for short), or may be one or more integrated circuits configured to implement this embodiment of the present invention, for example, one or more microprocessors (English: digital signal processor, DSP for short) or one or more field programmable gate arrays (English: Field Programmable Gate Array, FPGA for short). The processor 101 may run or execute a software program and/or a module stored in the memory 103, and invoke data stored in the memory 103, so as to perform various functions of the terminal 01.

In specific implementation, in an embodiment, the processor 101 may include one or more CPUs, for example, a CPU 0 and a CPU 1 shown in FIG. 2.

In specific implementation, in an embodiment, the terminal 01 may include multiple processors, for example, a processor 101 and a processor 105 shown in FIG. 2. Each of the processors may be a single-core (single-CPU) processor, or may be a multi-core (multi-CPU) processor. The processor herein may be one or more devices, circuits, and/or processing cores configured to process data (for example, a computer program instruction).

The display 102 may be configured to display information entered by a user or information provided for a user, and various menus of the terminal 01. The display 102 may include a display panel 1021. Optionally, the display panel 1021 may be configured by using a liquid crystal display (English: Liquid Crystal Display, LCD for short), an organic light-emitting diode (English: Organic Light-Emitting Diode, OLED for short), or the like.

The memory 103 may be a volatile memory (English: volatile memory), for example, a random access memory (English: random-access memory, RAM for short). The memory 103 may be a nonvolatile memory (English: nonvolatile memory), for example, a read-only memory (English: read-only memory, ROM for short), a flash memory (English: flash memory), a hard disk (English: hard disk drive, HDD for short), or a solid-state drive (English: solid-state drive, SSD for short). The memory 103 may be a combination of the foregoing types of memories, and may be configured to store a configuration file and a relevant application program for implementing a Wi-Fi hotspot recommendation method in the present invention.

The Wi-Fi module 104 may be a module that includes a Wi-Fi chip and a driver of the Wi-Fi chip. The Wi-Fi chip has a capability of running a wireless Internet standard protocol.

The structure of the device shown in FIG. 2 does not constitute a limitation on an electronic device. The device may include components more or fewer than those shown in the diagram, a combination of some components, or different component arrangements. Although not shown, the terminal may further include a battery, a camera lens, a Bluetooth module, a GPS module, and the like. Details are not described herein. Specific implementation is as follows:

The Wi-Fi module 104 is configured to scan a Wi-Fi hotspot in an area in which the terminal 01 is located.

The processor 101 is configured to: determine an Internet-accessible hotspot in Wi-Fi hotspots that are obtained by the Wi-Fi module 104 by means of scanning, and determine network quality obtained when the terminal accesses a network by using the Internet-accessible hotspot.

The display 102 is configured to display an identifier of the Internet-accessible hotspot and an identifier that indicates the network quality obtained when the terminal accesses the network by using the Internet-accessible hotspot.

The processor 101 is further configured to determine an authentication hotspot in the Wi-Fi hotspots that are obtained by the Wi-Fi module 104 by means of scanning. The authentication hotspot is a hotspot in which the terminal can normally access the Internet only by performing login authentication after being connected to the authentication hotspot.

Figure 3:
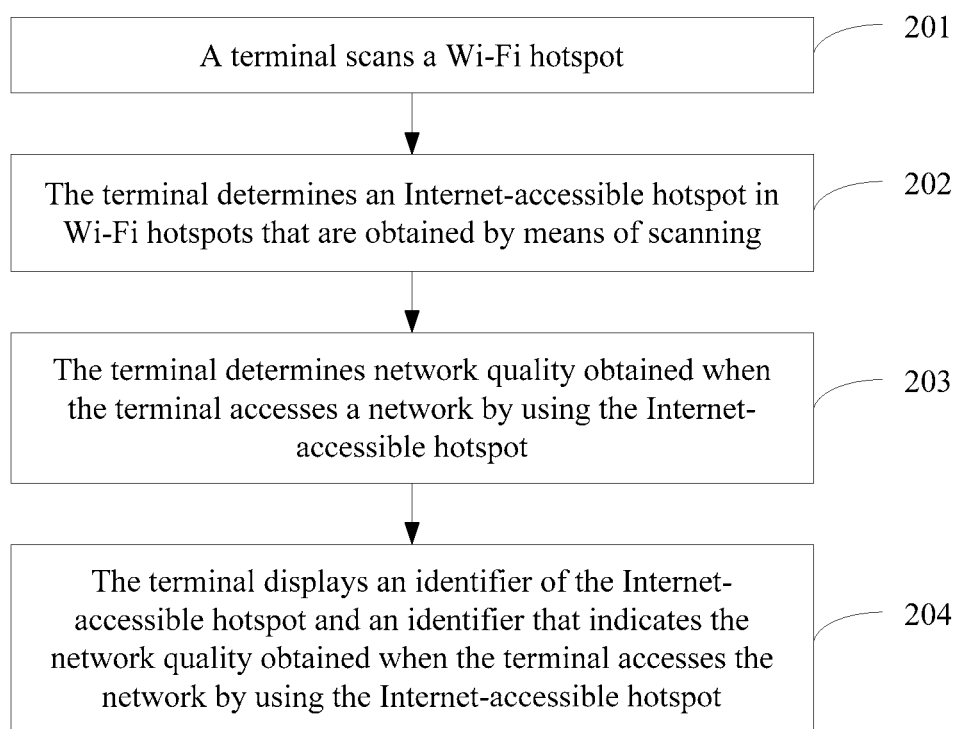
FIG. 3 is a flowchart of a Wi-Fi hotspot recommendation method according to an embodiment of the present invention.

FIG. 3 is a flowchart of a Wi-Fi hotspot recommendation method according to an embodiment of the present invention. The method is applied to a terminal 01. As shown in FIG. 3, the Wi-Fi hotspot recommendation method may include the following steps.

After a user enters a public area, when a WLAN function of a terminal of the user is enabled, the terminal starts to scan a Wi-Fi hotspot in the public area. In this case, to recommend a Wi-Fi hotspot with optimal Internet surfing experience to the user, the following steps 201 to 204 may be performed.

201. The terminal scans a Wi-Fi hotspot.

202. The terminal determines an Internet-accessible hotspot in Wi-Fi hotspots that are obtained by means of scanning.

The Internet-accessible hotspot is a Wi-Fi hotspot in which the terminal can normally access the Internet after being connected to the Internet-accessible hotspot. After performing a Wi-Fi hotspot scanning operation, the terminal may obtain, by means of scanning, all Wi-Fi hotspots in the area in which the terminal is located, and then determine the Internet-accessible hotspot from all the Wi-Fi hotspots obtained by means of scanning.

203. The terminal determines network quality obtained when the terminal accesses a network by using the Internet-accessible hotspot.

After determining the Internet-accessible hotspot in the Wi-Fi hotspots that are obtained by means of scanning, the terminal may determine the network quality obtained when the terminal accesses the network by using the Internet-accessible hotspot, so that the user can obtain real Internet surfing experience in the Wi-Fi hotspot.

204. The terminal displays an identifier of the Internet-accessible hotspot and an identifier that indicates the network quality obtained when the terminal accesses the network by using the Internet-accessible hotspot.

To enable the user to learn a Wi-Fi hotspot that is in displayed Wi-Fi hotspots and that has optimal Internet surfing experience, the terminal may display not only the identifier of the Internet-accessible hotspot but also the identifier that indicates the network quality obtained when the terminal accesses the network by using the Internet-accessible hotspot.

Figure 4:
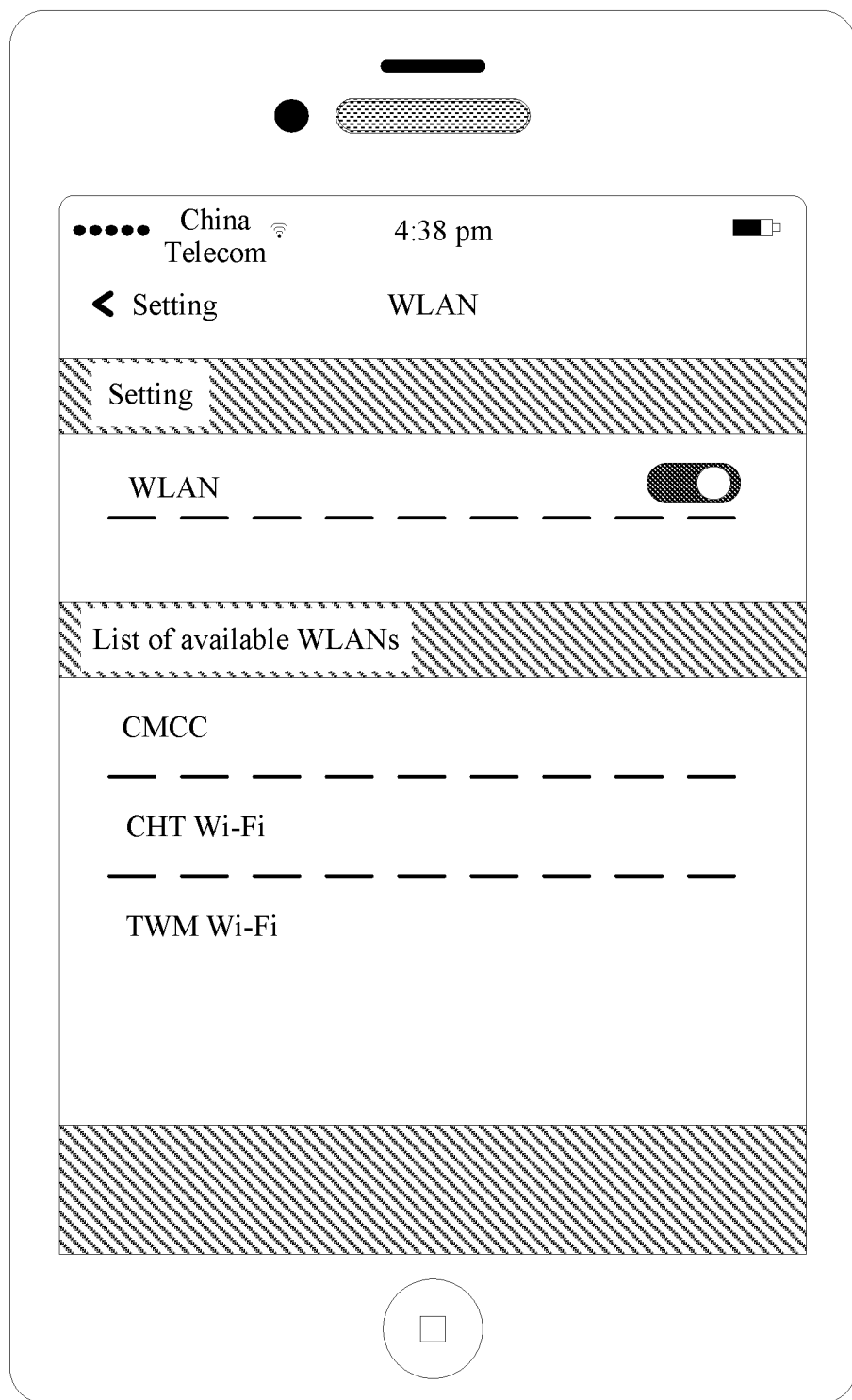
FIG. 4 is a schematic diagram of a graphical user interface that displays a Wi-Fi hotspot according to an embodiment of the present invention.

Certainly, in this embodiment of the present invention, after determining the network quality obtained when the terminal accesses the network by using the Internet-accessible hotspot, the terminal may further sequence Internet-accessible hotspots according to the determined network quality, and then display identifiers (for example, names of the Internet-accessible hotspots) of the Internet-accessible hotspots in sequence. In this way, the user may select the Wi-Fi hotspot with optimal Internet surfing experience according to the sequenced identifiers that are of the Internet-accessible hotspots and that are displayed on the terminal. For example, as shown in FIG. 4, the terminal may display the identifiers of the Wi-Fi hotspots on the terminal in descending order of network quality.

According to the Wi-Fi hotspot recommendation method provided in this embodiment of the present invention, the terminal scans the Wi-Fi hotspot in the area in which the terminal is located to obtain all the Wi-Fi hotspots in the area; then determines the Internet-accessible hotspot from the Wi-Fi hotspots obtained by means of scanning, and determines the network quality obtained when the terminal accesses the network by using the Internet-accessible hotspot; and finally displays the identifier of the Internet-accessible hotspot and the identifier that indicates the determined network quality obtained when the terminal accesses the network by using the Internet-accessible hotspot. In this way, when opening a WLAN setting page of the terminal, the user may view real Internet surfing experience obtained when the network is accessed by using the Wi-Fi hotspot, and further select the Wi-Fi hotspot with optimal Internet surfing experience from the displayed Wi-Fi hotspots for connection, thereby improving user experience.

Figure 5A:
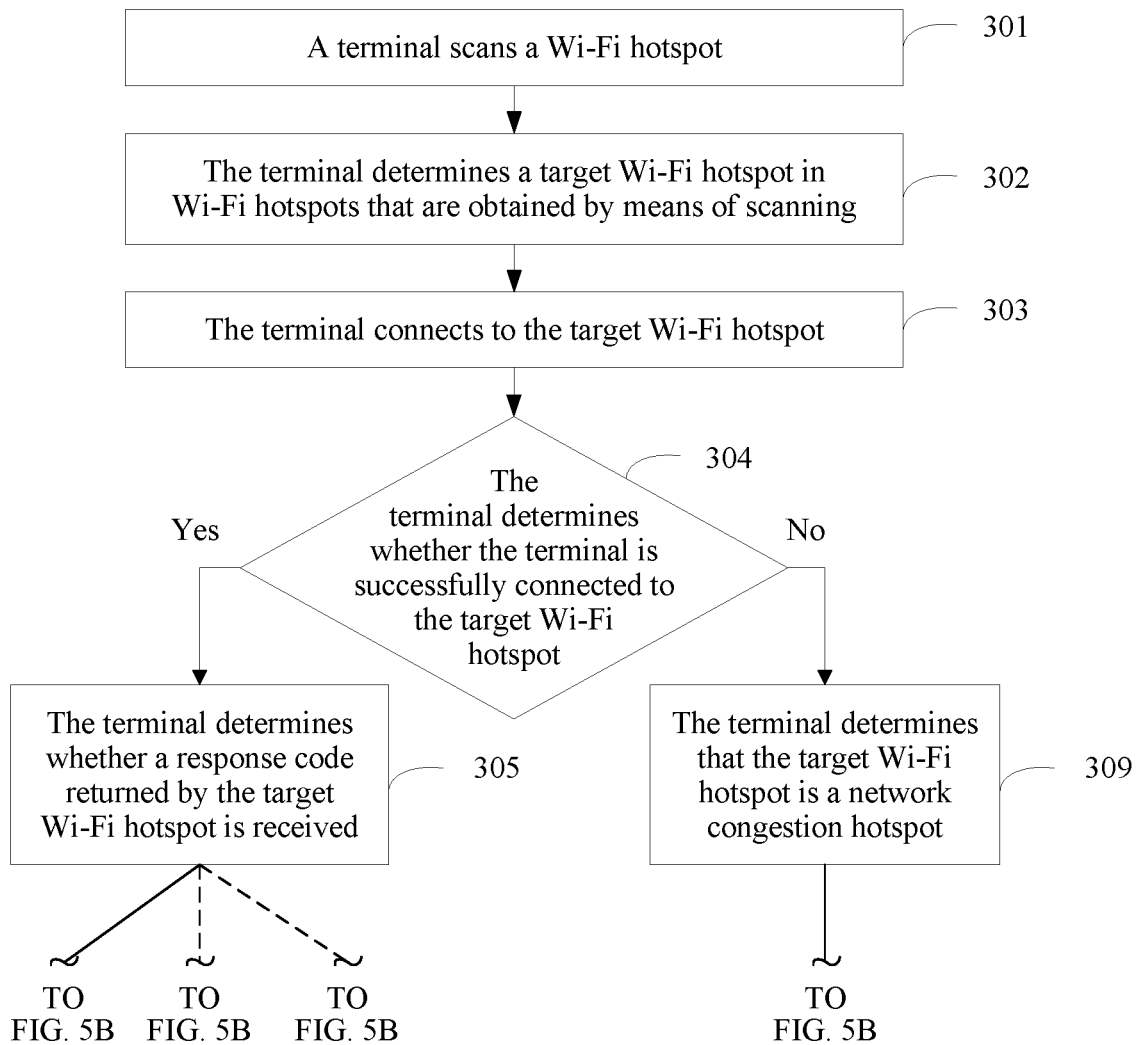
FIG. 5A and FIG. 5B are a flowchart of another Wi-Fi hotspot recommendation method according to an embodiment of the present invention.
Figure 5B:
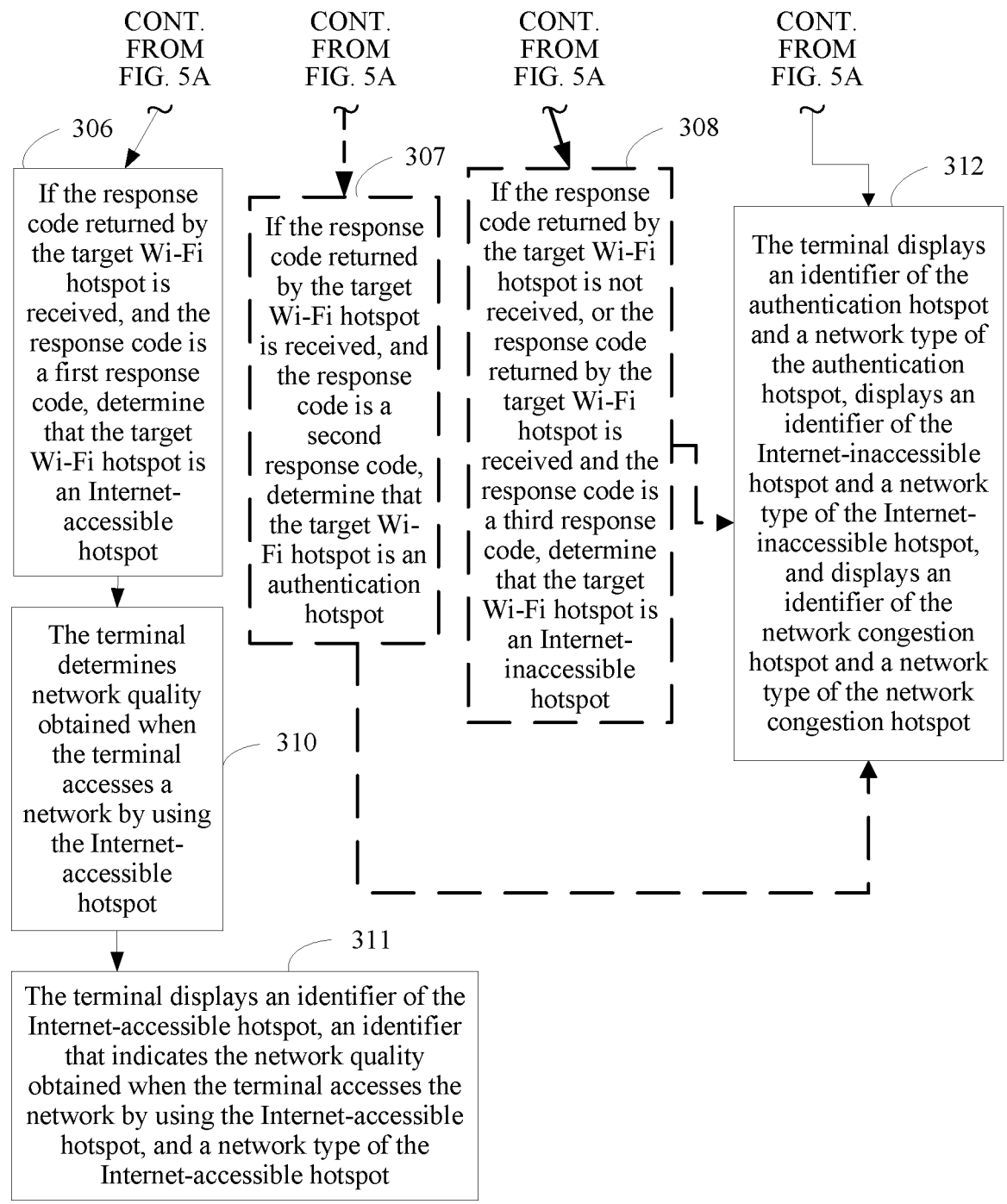

FIG. 5A and FIG. 5B are a flowchart of another Wi-Fi hotspot recommendation method according to an embodiment of the present invention. The method is applied to a terminal 01. As shown in FIG. 5A and FIG. 5B, the Wi-Fi hotspot recommendation method may include the following steps.

301. The terminal scans a Wi-Fi hotspot.

After a user enters a public area, when a WLAN function of a terminal of the user is enabled, the terminal may perform a scanning (English: Scanning) operation to obtain all Wi-Fi hotspots in the public area.

302. The terminal determines a target Wi-Fi hotspot in Wi-Fi hotspots that are obtained by means of scanning.

The target Wi-Fi hotspot includes at least one of a Wi-Fi hotspot whose identification information is stored in the terminal or an open Wi-Fi hotspot that does not need to be identified. That is, the target Wi-Fi hotspot is a Wi-Fi hotspot that can be directly connected without manual authentication of the user. The target Wi-Fi hotspot may include a Wi-Fi hotspot whose password is stored and a Wi-Fi hotspot that does not need a password.

For example, the target Wi-Fi hotspot may be a Wi-Fi hotspot whose user name and password are stored in the terminal, or the target Wi-Fi hotspot is an open Wi-Fi hotspot whose user name and password are not stored in the terminal.

Specifically, the terminal cannot use a nonopen Wi-Fi hotspot whose identification information is not stored in the terminal. Therefore, after obtaining all the Wi-Fi hotspots in the public area in which the terminal is located, the terminal may first select, from the Wi-Fi hotspots, all Wi-Fi hotspots whose identification information is stored in the terminal (the Wi-Fi hotspots whose identification information is stored in the terminal include an open Wi-Fi hotspot whose identification information is stored in the terminal and a nonopen Wi-Fi hotspot whose identification information is stored in the terminal) and an open Wi-Fi hotspot that does not need to be identified. That is, a nonopen Wi-Fi hotspot whose identification information is not stored in the terminal may be first filtered out.

To ensure compatibility with the prior art, for a terminal that supports only a single-frequency mode (the terminal that supports the single-frequency mode is a terminal that can be connected to only one Wi-Fi hotspot at a time), before performing step 302, the terminal may determine whether the terminal is currently connected to a Wi-Fi hotspot. If determining that the terminal is not currently connected to the Wi-Fi hotspot, the terminal may perform step 302. Alternatively, if determining that the terminal is currently connected to the Wi-Fi hotspot, the terminal may directly determine network quality obtained when a network is accessed by using the currently connected Wi-Fi hotspot, and may display the network quality obtained when the network is accessed by using the currently connected Wi-Fi hotspot, so that the user learns the network quality obtained when the network is accessed by using the currently connected Wi-Fi hotspot (a specific obtaining method is not specifically limited in this embodiment of the present invention).

For a terminal that supports a multi-frequency mode (the terminal that supports the multi-frequency mode is a terminal that can be connected to multiple Wi-Fi hotspots at a time), before performing step 302, the terminal may determine whether the terminal is currently connected to a Wi-Fi hotspot. If determining that the terminal is not currently connected to the Wi-Fi hotspot, the terminal may perform step 302. Alternatively, if determining that the terminal is currently connected to the Wi-Fi hotspot, the terminal may perform step 302 while retaining a communication connection to the current Wi-Fi hotspot. That is, the terminal obtains network quality obtained when a network is accessed by using another Wi-Fi hotspot, and may present, to the user, the network quality obtained when the network is accessed by using the another Wi-Fi hotspot, so that the user learns the network quality obtained when the network is accessed by using the another Wi-Fi hotspot other than the currently connected Wi-Fi hotspot.

To recommend a Wi-Fi hotspot with optimal Internet surfing experience to the user, after determining the target Wi-Fi hotspot, the terminal may further perform the following steps 303 to 314 for each of all target Wi-Fi hotspots.

303. The terminal connects to the target Wi-Fi hotspot.

A process in which the terminal connects to the target Wi-Fi hotspot may specifically include three processes: an authentication (English: Authentication) process, an association (English: Association) process, and a DHCP process.

To increase a speed of connecting to a Wi-Fi hotspot by the terminal, preferably, the DHCP process in the process of connecting to the target Wi-Fi hotspot may be completed by performing the following processes:

The terminal determines whether IP configuration information required for connecting to the target Wi-Fi hotspot is stored; and when the IP configuration information exists, the terminal connects to the target Wi-Fi hotspot according to the IP configuration information, where the IP configuration information is IP configuration information that is dynamically allocated when the terminal is previously connected to the target Wi-Fi hotspot (for example, the terminal is connected to the target Wi-Fi hotspot for the first time); or when the IP configuration information does not exist, the terminal obtains the IP configuration information by performing a DHCP operation, and saves the IP configuration information; and the terminal connects to the target Wi-Fi hotspot according to the IP configuration information.

It should be noted that the IP configuration information in this embodiment of the present invention includes but is not limited to at least one of the following: a domain name (English: domains), an IP address, a gateway (English: gateway) address, or a domain name server (English: Domain Name Server, DNS) address.

For example, when connecting to a Wi-Fi hotspot for the first time, the terminal may store, in a database of the terminal, IP configuration information dynamically allocated in this connection process. When connecting to the Wi-Fi hotspot again, the terminal may obtain, by parsing a historical DHCP data element, the IP configuration information stored when the Wi-Fi hotspot is connected for the first time, and directly configure a static network IP according to the obtained IP configuration information, so as to connect to the Wi-Fi hotspot. In this way, the DHCP operation does not need to be performed, so that the speed of connecting to a Wi-Fi hotspot is increased. Certainly, if the network is abnormal when the terminal connects to the Wi-Fi hotspot again by using the stored IP configuration information, the terminal needs to re-perform the DHCP operation, so as to obtain new IP configuration information, and further complete a connection to the Wi-Fi hotspot.

Further, to enable the user to clearly view types of all the target Wi-Fi hotspots, in the present invention, a network type of each target Wi-Fi hotspot is detected by performing the following steps 304 to 310. The network type may include but is not limited to: Internet accessibility, Internet inaccessibility, login authentication required, and network congestion.

304. The terminal determines whether the terminal is successfully connected to the target Wi-Fi hotspot.

If determining that the terminal is successfully connected to the target Wi-Fi hotspot, the terminal may perform the following steps 305 to 308; or if determining that the terminal is not successfully connected to the target Wi-Fi hotspot, the terminal may perform step 309.

305. The terminal determines whether a response code returned by the target Wi-Fi hotspot is received.

After successfully connecting to the target Wi-Fi hotspot, the terminal may detect a network type of the target Wi-Fi hotspot. Specifically, the terminal may send a detection request to a server by using the target Wi-Fi hotspot. In addition, detection waiting timeout duration may be set to determine whether the response code returned by the target Wi-Fi hotspot is received within the detection waiting timeout duration. The server sends the response code to the target Wi-Fi hotspot after receiving the detection request sent by the target Wi-Fi hotspot.

For example, if timeout duration for establishing a connection is set to 10 s, and timeout duration for reading data is set to 10 s, total detection waiting timeout duration may be set to 2×12=24 s. That is, after sending the detection request to the server by using the target Wi-Fi hotspot, the terminal may determine, according to the specified detection waiting timeout duration 24 s, whether the response code returned by the target Wi-Fi hotspot is received.

306. If the response code returned by the target Wi-Fi hotspot is received, and the response code is a first response code, determine that the target Wi-Fi hotspot is an Internet-accessible hotspot.

The Internet-accessible hotspot is a Wi-Fi hotspot in which the terminal can normally access the Internet after being connected to the Internet-accessible hotspot. That is, when determining that the response code is received, and the response code is the first response code, the terminal may determine that the network type of the target Wi-Fi hotspot is Internet accessibility.

For example, according to the Hypertext Transfer Protocol (English: Hyper Text Transport Protocol, HTTP for short) standard protocol, if the response code (English: response code) is 200, it indicates that the network type is Internet accessibility, or if the response code is 301, 302, 303, or 307, it indicates that the network type is login authentication required. Another response code indicates that the network type is Internet inaccessibility. In addition, according to an example in step 306, if the terminal receives, within 24 s, the response code returned by the target Wi-Fi hotspot, and the response code is 200, the terminal determines that the target Wi-Fi hotspot is the Internet-accessible hotspot, that is, determines that the network type of the target Wi-Fi hotspot is Internet accessibility.

307. If the response code returned by the target Wi-Fi hotspot is received, and the response code is a second response code, determine that the target Wi-Fi hotspot is an authentication hotspot.

The authentication hotspot is a Wi-Fi hotspot in which the terminal can normally access the Internet only by performing login authentication after being connected to the authentication hotspot. That is, when determining that the response code is received, and the response code is the second response code, the terminal may determine that the network type of the target Wi-Fi hotspot is login authentication required. A specific process in which the terminal accesses the Internet by using the authentication hotspot is as follows: If a password is not set for the authentication hotspot, the terminal may directly connect to the hotspot, and perform login authentication after being successfully connected to the hotspot, and can normally access the Internet only after completing the login authentication. Alternatively, if a password is set for the authentication hotspot, the terminal first needs to enter the password in an authentication phase, and performs the association process and the DHCP process after authentication succeeds, so as to complete a connection to the hotspot. After being successfully connected to the hotspot, the terminal continues to perform login authentication, and can normally access the Internet only after completing the login authentication.

For example, according to the example in step 305 and step 306, if the terminal receives, within 24 s, the response code returned by the target Wi-Fi hotspot, and the response code is 303, the terminal determines that the target Wi-Fi hotspot is the authentication hotspot, that is, determines that the network type of the target Wi-Fi hotspot is login authentication required.

308. If the response code returned by the target Wi-Fi hotspot is not received, or the response code returned by the target Wi-Fi hotspot is received and the response code is a third response code, determine that the target Wi-Fi hotspot is an Internet-inaccessible hotspot.

The Internet-inaccessible hotspot is a Wi-Fi hotspot in which the terminal cannot normally access the Internet after being connected to the Internet-inaccessible hotspot. That is, when the terminal determines that the response code returned by the target Wi-Fi hotspot is not received, or determines that the response code is received and the response code is the third response code, the terminal may determine that the network type of the target Wi-Fi hotspot is Internet inaccessibility.

For example, according to the example in step 305 and step 306, if the terminal receives, within 24 s, the response code returned by the target Wi-Fi hotspot, and the response code is 305, the terminal determines that the target Wi-Fi hotspot is the Internet-inaccessible hotspot, that is, determines that the network type of the target Wi-Fi hotspot is Internet inaccessibility; or if the terminal does not receive, within 24 s, the response code returned by the target Wi-Fi hotspot, the terminal determines that the target Wi-Fi hotspot is the Internet-inaccessible hotspot, that is, determines that the network type of the target Wi-Fi hotspot is Internet inaccessibility.

309. The terminal determines that the target Wi-Fi hotspot is a network congestion hotspot.

The network congestion hotspot is a Wi-Fi hotspot to which the terminal cannot be successfully connected, or a Wi-Fi hotspot in which the Internet accessed by the terminal is in jitter after the terminal is connected to the network congestion hotspot. That is, when determining that the terminal is not successfully connected to the target Wi-Fi hotspot, the terminal may determine that the network type of the target Wi-Fi hotspot is network congestion.

Specifically, the terminal may determine, in any one of the following manners, that the terminal is not successfully connected to the target Wi-Fi hotspot.

Manner 1: After sending a connection request to the target Wi-Fi hotspot, the terminal does not receive, within preset duration, a response message returned by the target Wi-Fi hotspot.

Manner 2: After sending a connection request to the target Wi-Fi hotspot, the terminal receives a rejection message returned by the target Wi-Fi hotspot.

Manner 3: After being connected to the target Wi-Fi hotspot, the terminal is compelled to be disconnected.

Certainly, by means of multiple attempts, the terminal may determine that the terminal cannot be successfully connected to the target Wi-Fi hotspot indeed. For example, after sending two consecutive connection requests to the target Wi-Fi hotspot, when determining that the terminal does not receive, within the preset duration, the response message returned by the target Wi-Fi hotspot, the terminal may determine that the terminal is not successfully connected to the target Wi-Fi hotspot. When determining that the terminal is compelled to be disconnected after being connected to the target Wi-Fi hotspot for three consecutive times, the terminal may determine that the terminal is not successfully connected to the target Wi-Fi hotspot.

In this embodiment of the present invention, to further determine whether a detection result is correct, the terminal may compare the detection result with a historical detection record after determining the network type of the target Wi-Fi hotspot, so as to improve detection accuracy. In addition, when determining that a current detection result is inaccurate, the terminal may re-detect the network type of the target Wi-Fi hotspot.

For example, if it is currently detected that the target Wi-Fi hotspot is the Internet-accessible hotspot, that is, the network type of the target Wi-Fi hotspot is "Internet accessibility", but an obtained historical record indicates that the network type of the target Wi-Fi hotspot is "login authentication required", it indicates that the current detection result may be inaccurate. If it is currently detected that the target Wi-Fi hotspot is the authentication hotspot, that is, the network type of the target Wi-Fi hotspot is "login authentication required", but an obtained historical record indicates that the network type of the target Wi-Fi hotspot is "Internet accessibility", it indicates that the current detection result may be inaccurate. If it is currently detected that the target Wi-Fi hotspot is the Internet-inaccessible hotspot, that is, the network type of the target Wi-Fi hotspot is "Internet inaccessibility", but an obtained historical record indicates that the network type of the target Wi-Fi hotspot is "Internet accessibility", it indicates that the current detection result may be inaccurate.

A historical record may be specifically determined as follows: For the authentication hotspot, that is, a Wi-Fi hotspot whose network type is login authentication required, if a historical record includes one record that the network type of the Wi-Fi hotspot is login and authentication required, it is learned that the historical record of the network type of the Wi-Fi hotspot is login authentication required. For the Internet-accessible hotspot, that is, a Wi-Fi hotspot whose network type is Internet accessibility, if the network type is recorded only once in a historical record, and the recorded network type of the Wi-Fi hotspot is Internet accessibility, it is learned that the historical record of the network type of the Wi-Fi hotspot is Internet accessibility; if the network type is recorded twice in a historical record, and the historical record includes one record that the network type of the Wi-Fi hotspot is Internet accessibility, it is learned that the historical record of the network type of the Wi-Fi hotspot is Internet accessibility; or if the network type is recorded three times or more in a historical record, and that the network type of the Wi-Fi hotspot is Internet accessibility is recorded at a rate of greater than or equal to 50%, it is learned that the historical record of the network type of the Wi-Fi hotspot is Internet accessibility. For the Internet-inaccessible hotspot, that is, a Wi-Fi hotspot whose network type is Internet inaccessibility, if the network type is recorded only once in a historical record, and the recorded network type of the Wi-Fi hotspot is Internet inaccessibility, it is learned that the historical record of the network type of the Wi-Fi hotspot is Internet inaccessibility; if the network type is recorded twice in a historical record, and the histori-cal record includes one record that the network type of the Wi-Fi hotspot is Internet inaccessibility, it is learned that the historical record of the network type of the Wi-Fi hotspot is Internet inaccessibility; or if the network type is recorded three times or more in a historical record, and that the network type of the Wi-Fi hotspot is Internet inaccessibility is recorded at a rate of greater than or equal to 50%, it is learned that the historical record of the network type of the Wi-Fi hotspot is Internet inaccessibility.

Further, for the Internet-accessible hotspot determined in step 306, the terminal needs to further determine, by performing step 310, network quality obtained when the network is accessed by using the Internet-accessible Wi-Fi hotspot, so as to recommend a Wi-Fi hotspot to the user according to the network quality.

310. The terminal determines network quality obtained when the terminal accesses a network by using the Internet-accessible hotspot.

Specifically, the terminal may determine, by performing the following steps, the network quality obtained when the terminal accesses the network by using the Internet-accessible hotspot.

Step 1: Send a network data loading request to the Internet-accessible hotspot.

Step 2: Obtain network data that is returned by the Internet-accessible hotspot and that is corresponding to the network data loading request.

Step 3: Collect a data loading parameter in a network data loading process, where the data loading parameter includes at least one piece of TCP data or Wi-Fi OTA data.

Step 4: Determine, according to the data loading parameter and a preset rating condition, the network quality obtained when the terminal accesses the network by using the Internet-accessible hotspot.

For example, it is assumed that rating data includes the TCP data and the OTA data. A quality of service engine (English: Quality of Service Engine, QoS Engine for short) of the terminal may initiate a hotspot rating request, to load a local portal site, download a specified file, or upload a specified file for a period of time in the background, so that TCP data and OTA data in the period of time in which the local portal site is loaded, the specified file is downloaded, or the specified file is uploaded are obtained. Then, the terminal may determine, according to the obtained TCP data, the obtained OTA data, and the preset rating condition, the network quality obtained when the terminal accesses the network by using the Internet-accessible hotspot.

The TCP data may include at least one of the following: a TCP round trip time (English: Round-Trip Time, RTT for short), a TCP retransmission rate, or a TCP congestion status. The TCP RTT is an RTT average of all sockets (English: socket) in the period of time. The TCP retransmission rate is a retransmission rate of transmitted packets in all the sockets in the period of time. The TCP congestion status is an occurrence rate of congestion (which may include but is not limited to at least one of the following: disorder (English: disorder), recovery (English: recovery), or congestion window reduced (English: Congestion Window Reduced, CWR for short)) of all the sockets in the period of time. The OTA data may include at least one of the following: a Wi-Fi packet loss rate or a transmit (English: transmit, TX for short) and receive (English: receive, RX for short) rate.

For example, it is assumed that the network quality obtained when the terminal accesses the network by using the Internet-accessible hotspot is obtained according to the TCP RTT. In this case, when it is specified that the TCP RTT is less than 100 ms, it is considered that the network quality obtained when the terminal accesses the network by using the Internet-accessible hotspot is high; when the TCP RTT is greater than 100 ms and is less than 500 ms, it is considered that the network quality obtained when the terminal accesses the network by using the Internet-accessible hotspot is moderate; or when the TCP RTT is greater than 500 ms, it is considered that the network quality obtained when the terminal accesses the network by using the Internet-accessible hotspot is low. It is assumed that the network quality obtained when the terminal accesses the network by using the Internet-accessible hotspot is obtained according to the TCP retransmission rate. In this case, when it is specified that the TCP retransmission rate is less than 10%, it is considered that the network quality obtained when the terminal accesses the network by using the Internet-accessible hotspot is high; when the TCP retransmission rate is greater than 10% and is less than 40%, it is considered that the network quality obtained when the terminal accesses the network by using the Internet-accessible hotspot is moderate; or when the TCP retransmission rate is greater than 40%, it is considered that the network quality obtained when the terminal accesses the network by using the Internet-accessible hotspot is low. It is assumed that the network quality obtained when the terminal accesses the network by using the Internet-accessible hotspot is obtained according to the TCP congestion status. In this case, when it is specified that the TCP congestion status is less than 5%, it is considered that the network quality obtained when the terminal accesses the network by using the Internet-accessible hotspot is high; when the TCP congestion status is greater than 5% and is less than 10%, it is considered that the network quality obtained when the terminal accesses the network by using the Internet-accessible hotspot is moderate; or when the TCP congestion status is greater than 10%, it is considered that the network quality obtained when the terminal accesses the network by using the Internet-accessible hotspot is low. It is assumed that the network quality obtained when the terminal accesses the network by using the Internet-accessible hotspot is obtained according to the Wi-Fi packet loss rate. In this case, when it is specified that the Wi-Fi packet loss rate is less than 10%, it is considered that the network quality obtained when the terminal accesses the network by using the Internet-accessible hotspot is high; when the Wi-Fi packet loss rate is greater than 10% and is less than 30%, it is considered that the network quality obtained when the terminal accesses the network by using the Internet-accessible hotspot is moderate; or when the Wi-Fi packet loss rate is greater than 30%, it is considered that the network quality obtained when the terminal accesses the network by using the Internet-accessible hotspot is low. It is assumed that the network quality obtained when the terminal accesses the network by using the Internet-accessible hotspot is obtained according to the TX and RX rate. In this case, when it is specified that the TX and RX rate is greater than 350 KB/s, it is considered that the network quality obtained when the terminal accesses the network by using the Internet-accessible hotspot is high; when the TX and RX rate is greater than 20 KB/s and is less than 350 KB/s, it is considered that the network quality obtained when the terminal accesses the network by using the Internet-accessible hotspot is moderate; or when the TX and RX rate is less than 20 KB/s, it is considered that the network quality obtained when the terminal accesses the network by using the Internet-accessible hotspot is low.

Certainly, the network quality obtained when the terminal accesses the network by using the Internet-accessible hotspot may be obtained by using a combination of two or more of the foregoing parameters. A specific rule may be set according to a requirement in an actual application scenario. This is not specifically limited in this embodiment of the present invention.

It should be noted that, in this embodiment of the present invention, an example is described only for evaluating a rating condition of network quality obtained when the network is accessed by using a Wi-Fi hotspot. The rating condition may be specifically set according to a requirement in an actual application scenario. This is not specifically limited in this embodiment of the present invention.

311. The terminal displays an identifier of the Internet-accessible hotspot, an identifier that indicates the network quality obtained when the terminal accesses the network by using the Internet-accessible hotspot, and a network type of the Internet-accessible hotspot.

Figure 6:
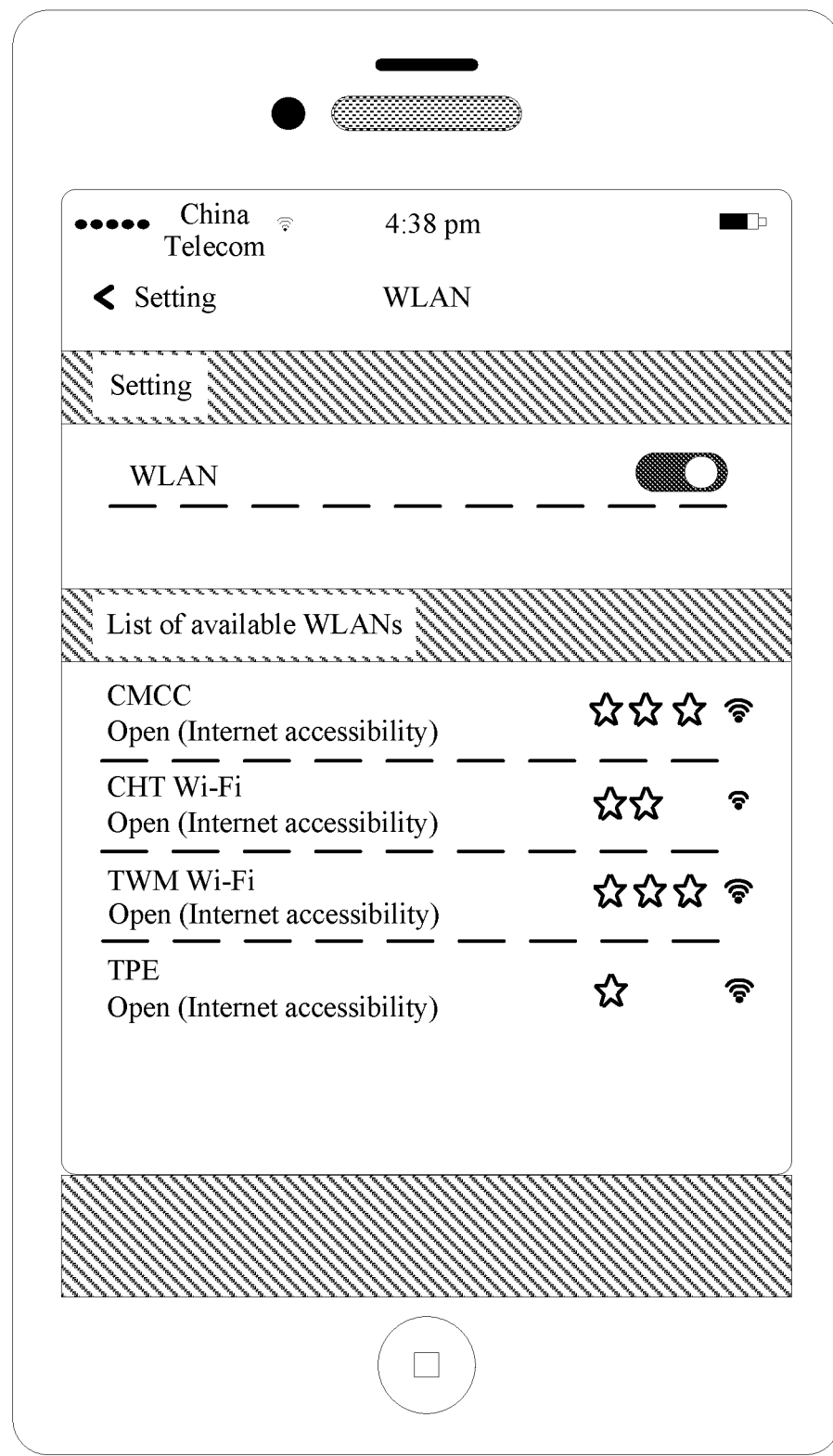
FIG. 6 is a schematic diagram of another graphical user interface that displays a Wi-Fi hotspot according to an embodiment of the present invention.

For example, referring to FIG. 6, a five-pointed star quantity may be used to mark the network quality obtained when the terminal accesses the network by using the Internet-accessible hotspot (that is, the identifier that indicates the network quality obtained when the terminal accesses the network by using the Internet-accessible hotspot is a five-pointed star). A larger five-pointed star quantity indicates higher network quality obtained when the terminal accesses the network by using a corresponding Internet-accessible hotspot. Certainly, in this embodiment of the present invention, an example is used only to describe a form of the identifier that indicates the network quality obtained when the terminal accesses the network by using the Internet-accessible hotspot. In an actual application scenario, another form may be used to indicate the identifier of the network quality obtained when the terminal accesses the network by using the Internet-accessible hotspot. This is not specifically limited in this embodiment of the present invention.

312. The terminal displays an identifier of the authentication hotspot and a network type of the authentication hotspot, displays an identifier of the Internet-inaccessible hotspot and a network type of the Internet-inaccessible hotspot, and displays an identifier of the network congestion hotspot and a network type of the network congestion hotspot.

Figure 7:
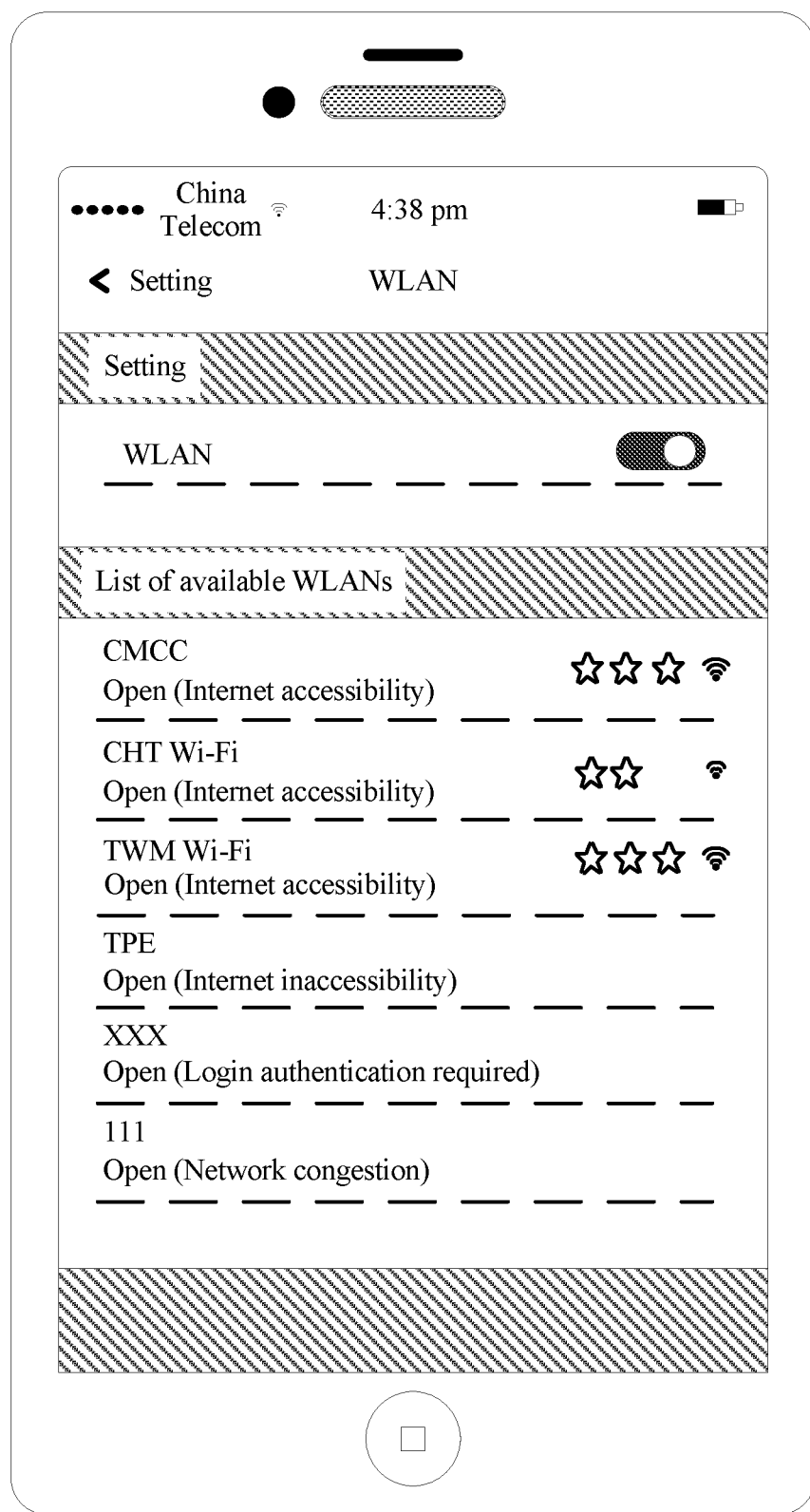
FIG. 7 is a schematic diagram of still another graphical user interface that displays a Wi-Fi hotspot according to an embodiment of the present invention.

The terminal may further present and mark a Wi-Fi hotspot whose network type is login authentication required, Internet inaccessibility, or network congestion, so that an advance warning can be issued. For example, the Wi-Fi hotspot may be marked with reference to FIG. 7. Certainly, in this embodiment of the present invention, an example is used only to describe a marking form of the network type. In an actual application scenario, another form may be used to mark the network type. This is not specifically limited in this embodiment of the present invention.

Further, after performing step 304, if the terminal determines that the terminal is successfully connected to the target Wi-Fi hotspot, in this embodiment of the present invention, preferably, the terminal may further determine to retain a default routing network port of the terminal, so that the user can be prevented from sensing a process in which the terminal classifies all the target Wi-Fi hotspots and obtains network quality obtained when the terminal accesses the network by using each target Wi-Fi hotspot. Further, the terminal may determine not to present a state in which the terminal is connected to the target Wi-Fi hotspot (for example, after being successfully connected to the target Wi-Fi hotspot, the terminal does not display an identifier of the connected target Wi-Fi hotspot in a status notification bar of the terminal).

For example, for a terminal that supports only a single-frequency mode or a multi-frequency mode, if the terminal is not connected to a Wi-Fi hotspot before evaluation, after the terminal is successfully connected to the target Wi-Fi hotspot, the terminal may determine to retain a default routing network port of the terminal. That is, the user and a third-party application cannot sense that the terminal is successfully connected to the target Wi-Fi hotspot. In addition, the terminal determines not to present, on a user interface (English: user interface, UI for short) of the terminal, a state in which the terminal is connected to the target Wi-Fi hotspot. When the terminal is successfully connected to the target Wi-Fi hotspot, and retains the default routing network port, if a mobile data service of the terminal is currently enabled, except that the terminal obtains a data loading parameter required for network quality obtained when the terminal accesses the network by using the Wi-Fi hotspot, all traffic of other services uses the mobile data service. That is, currently, the terminal can not only use the mobile data service to normally access the network but also obtain the network quality obtained when the network is accessed by using the Wi-Fi hotspot, so as to learn the network quality obtained when the network is accessed by using the Wi-Fi hotspot. Certainly, if the mobile data service of the terminal is not currently enabled, the user and the third-party application cannot access the network because the default routing network port of the terminal does not change after the terminal is successfully connected to the target Wi-Fi hotspot.

If a terminal that supports a multi-frequency mode is connected to a Wi-Fi hotspot before evaluation, the terminal keeps retaining the current connection to the Wi-Fi hotspot, and connects to the target Wi-Fi hotspot in the background. After being successfully connected to the target Wi-Fi hotspot, the terminal may determine to retain a default routing network port of the terminal. That is, the user and a third-party application cannot sense that the terminal is successfully connected to the target Wi-Fi hotspot. In addition, the terminal determines not to present, on a UI of the terminal, a state in which the terminal is connected to the target Wi-Fi hotspot, but to present only a status of the originally connected Wi-Fi hotspot. In addition, except that the terminal obtains a data loading parameter required for network quality obtained when the terminal accesses the network by using the Wi-Fi hotspot, all traffic of other services uses the originally connected Wi-Fi hotspot.

According to the Wi-Fi hotspot recommendation method provided in this embodiment of the present invention, the terminal scans the Wi-Fi hotspot in the area in which the terminal is located to obtain all the Wi-Fi hotspots in the area; then determines the Internet-accessible hotspot from the Wi-Fi hotspots obtained by means of scanning, and determines the network quality obtained when the terminal accesses the network by using the Internet-accessible hotspot; and finally displays the identifier of the Internet-accessible hotspot and the determined network quality obtained when the terminal accesses the network by using the Internet-accessible hotspot. In this way, when opening a WLAN setting page of the terminal, the user may view real Internet surfing experience obtained when the network is accessed by using the Wi-Fi hotspot, and further select the Wi-Fi hotspot with optimal Internet surfing experience from displayed Wi-Fi hotspots for connection, thereby improving user experience.

In addition, a Wi-Fi hotspot whose network type is login authentication required, Internet inaccessibility, or network congestion is presented to the user in advance, so as to avoid a case in which the user cannot normally access the network after accessing the Wi-Fi hotspot of the foregoing type. The target Wi-Fi hotspot is connected by using the IP configuration information stored when the target Wi-Fi hotspot is previously connected, so that a speed of connecting to the target Wi-Fi hotspot is increased, and power consumption of the terminal is reduced. In addition, network quality obtained when the network is accessed by using a Wi-Fi hotspot is obtained by loading network data in the background. Further, after the target Wi-Fi hotspot is successfully connected, the default routing network port of the terminal is retained, and a terminal connection status is not presented on the UI of the terminal, so that the user and the third-party application can be prevented from sensing the status, and user experience is further improved.

Figure 8:
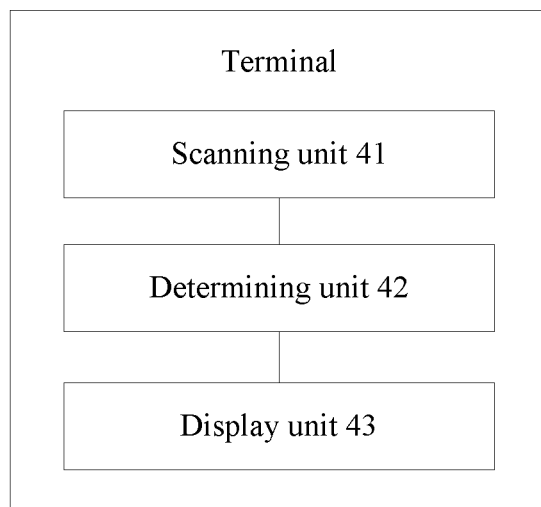
FIG. 8 is a schematic diagram of composition of a terminal according to an embodiment of the present invention.

Another embodiment of the present invention provides a terminal. As shown in FIG. 8, the terminal may include a scanning unit 41, a determining unit 42, and a display unit 43.

The scanning unit 41 is configured to scan a Wi-Fi hotspot.

The determining unit 42 is configured to: determine an Internet-accessible hotspot in Wi-Fi hotspots that are obtained by the scanning unit 41 by means of scanning, and determine network quality obtained when the terminal accesses a network by using the Internet-accessible hotspot.

The display unit 43 is configured to display an identifier of the Internet-accessible hotspot and an identifier that indicates the network quality obtained when the terminal accesses the network by using the Internet-accessible hotspot.

In this embodiment of the present invention, the determining unit 42 is further configured to determine an authentication hotspot in the Wi-Fi hotspots that are obtained by the scanning unit 41 by means of scanning. The authentication hotspot is a Wi-Fi hotspot in which the terminal can normally access the Internet only by performing login authentication after being connected to the authentication hotspot.

In this embodiment of the present invention, further, the determining unit 42 is specifically configured to: connect to the Wi-Fi hotspot; receive a response code returned by the Wi-Fi hotspot; and if the response code is a first response code, determine that the Wi-Fi hotspot is the Internet-accessible hotspot.

In this embodiment of the present invention, the determining unit 42 is further configured to: before connecting to the Wi-Fi hotspot, determine a target Wi-Fi hotspot in the Wi-Fi hotspots. The target Wi-Fi hotspot includes at least one of a Wi-Fi hotspot whose identification information is stored in the terminal or an open Wi-Fi hotspot that does not need to be identified.

The determining unit 42 is specifically configured to: connect to the target Wi-Fi hotspot; receive the response code returned by the target Wi-Fi hotspot; and if the response code is the first response code, determine that the target Wi-Fi hotspot is the Internet-accessible hotspot.

In this embodiment of the present invention, further, the determining unit 42 is specifically configured to: connect to the Internet-accessible hotspot; send a network data loading request to the Internet-accessible hotspot; obtain network data that is returned by the Internet-accessible hotspot and that is corresponding to the network data loading request; collect a data loading parameter in the network data loading process, where the data loading parameter includes at least one piece of Transmission Control Protocol TCP data or Wi-Fi over the air OTA data; and determine, according to the data loading parameter and a preset rating condition, the network quality obtained when the terminal accesses the network by using the Internet-accessible hotspot.

In this embodiment of the present invention, the determining unit 42 is further configured to determine an Internet-inaccessible hotspot in the Wi-Fi hotspots that are obtained by the scanning unit 41 by means of scanning. The Internet-inaccessible hotspot is a Wi-Fi hotspot in which the terminal cannot normally access the Internet after being connected to the Internet-inaccessible hotspot.

In this embodiment of the present invention, the determining unit 42 is further configured to determine a network congestion hotspot in the Wi-Fi hotspots that are obtained by the scanning unit 41 by means of scanning. The network congestion hotspot is a Wi-Fi hotspot to which the terminal cannot be successfully connected, or a Wi-Fi hotspot in which the Internet accessed by the terminal is in jitter after the terminal is connected to the network congestion hotspot.

In this embodiment of the present invention, the determining unit 42 is further configured to: if the terminal is successfully connected to the Wi-Fi hotspot, determine to retain a default routing network port of the terminal.

In this embodiment of the present invention, the determining unit 42 is further configured to: if the terminal is successfully connected to the Wi-Fi hotspot, determine not to display a state in which the terminal is successfully connected to the target Wi-Fi hotspot.

In this embodiment of the present invention, further, the determining unit 42 is specifically configured to: determine whether Internet Protocol IP configuration information required for connecting to the Wi-Fi hotspot is stored; and when the IP configuration information exists, connect to the Wi-Fi hotspot according to the IP configuration information.

The IP configuration information is IP configuration information that is dynamically allocated when the terminal is previously connected to the Wi-Fi hotspot.

In this embodiment of the present invention, further, the determining unit 42 is specifically configured to: when the IP configuration information does not exist, obtain the IP configuration information by performing a Dynamic Host Configuration Protocol DHCP operation, and save the IP configuration information; and connect to the Wi-Fi hotspot according to the IP configuration information.

It should be noted that, for a specific working process of each function module in the terminal provided in this embodiment of the present invention, refer to specific description of a corresponding process in the method embodiment. Details are not described again in this embodiment of the present invention.

The terminal provided in this embodiment of the present invention is configured to perform the Wi-Fi hotspot recommendation method, so that an effect the same as that in the Wi-Fi hotspot recommendation method can be achieved.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or a part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A Wireless Fidelity Wi-Fi hotspot recommendation method, wherein the method is applied to a terminal and comprises:
   scanning a Wi-Fi hotspot;
   determining an Internet-accessible hotspot in Wi-Fi hotspots obtained by scanning;
   determining network quality obtained when the terminal accesses a network by using the Internet-accessible hotspot; and
   displaying an identifier of the Internet-accessible hotspot and an identifier that indicates the network quality,
   wherein determining the Internet-accessible hotspot in Wi-Fi hotspots obtained by scanning comprises:
   connecting to the Wi-Fi hotspot;
   receiving a response code returned by the Wi-Fi hotspot; and
   determining, if the response code is a first response code, that the Wi-Fi hotspot is the Internet-accessible hotspot.

2. The method according to claim 1, further comprises:
   determining an authentication hotspot in the Wi-Fi hotspots that are obtained by scanning, wherein the authentication hotspot is a Wi-Fi hotspot in which the terminal accesses the Internet by performing login authentication after being connected to the authentication hotspot.

3. The method according to claim 1, wherein before the connecting to the Wi-Fi hotspot, the method further comprises:
   determining a target Wi-Fi hotspot in the Wi-Fi hotspots, wherein the target Wi-Fi hotspot comprises at least one of a Wi-Fi hotspot whose identification information is stored in the terminal or an open Wi-Fi hotspot that does not need to be identified; and, wherein
   connecting to the Wi-Fi hotspot comprises:
      connecting to the target Wi-Fi hotspot; and,
   receiving the response code returned by the Wi-Fi hotspot comprises:
      receiving the response code returned by the target Wi-Fi hotspot; and
   determining, if the response code is a first response code, that the Wi-Fi hotspot is the Internet-accessible hotspot comprises:
      if the response code is the first response code, determining that the target Wi-Fi hotspot is the Internet-accessible hotspot.

4. The method according to claim 1, wherein determining the network quality obtained when the terminal accesses a network by using the Internet-accessible hotspot comprises:
   connecting to the Internet-accessible hotspot;
   sending a network data loading request to the Internet-accessible hotspot;
   obtaining network data that is returned by the Internet-accessible hotspot and that is corresponding to the network data loading request;
   collecting a data loading parameter in the network data loading request, wherein the data loading parameter comprises at least one piece of Transmission Control Protocol (TCP) data or Wi-Fi over-the-air (OTA) data; and
   determining, according to the data loading parameter and a preset rating condition, the network quality obtained when the terminal accesses the network by using the Internet-accessible hotspot.

5. The method according to claim 1, wherein the method further comprises:
   determining an Internet-inaccessible hotspot in the Wi-Fi hotspots that are obtained by scanning, wherein the Internet-inaccessible hotspot is a Wi-Fi hotspot in which the terminal cannot normally access the Internet after being connected to the Internet-inaccessible hotspot.

6. The method according to claim 1, wherein the method further comprises:
   determining a network congestion hotspot in the Wi-Fi hotspots obtained by scanning, wherein the network congestion hotspot is a Wi-Fi hotspot to which the terminal is not successfully connected, or a Wi-Fi hotspot in which the Internet accessed by the terminal is in jitter after the terminal is connected to the network congestion hotspot.

7. The method according to claim 1, wherein if the terminal is successfully connected to the Wi-Fi hotspot, the method further comprises:
   determining to retain a default routing network port of the terminal.

8. The method according to claim 1, wherein if the terminal is successfully connected to the Wi-Fi hotspot, the method further comprises:
   determining not to display a state in which the terminal is successfully connected to the Wi-Fi hotspot.

9. The method according to claim 1, wherein the connecting to the Wi-Fi hotspot comprises:
   determining whether Internet Protocol (IP) configuration information required for connecting to the Wi-Fi hotspot is stored; and
   when the IP configuration information exists, connecting to the Wi-Fi hotspot according to the IP configuration information, wherein
   the IP configuration information is IP configuration information that is dynamically allocated when the terminal is previously connected to the Wi-Fi hotspot.

10. The method according to claim 9, further comprising:
    when the IP configuration information does not exist, obtaining the IP configuration information by performing a Dynamic Host Configuration Protocol (DHCP) operation, and saving the IP configuration information; and
    connecting to the Wi-Fi hotspot according to the IP configuration information.

11. A terminal, comprising: at least one processor, a display, a memory, and a Wireless Fidelity (Wi-Fi) module, wherein
    the memory is configured to store an instruction;
    the Wi-Fi module is configured to scan a Wi-Fi hotspot;
    the processor is configured to invoke the instruction stored in the memory to:
    determine an Internet-accessible hotspot in Wi-Fi hotspots that are obtained by the Wi-Fi module by scanning; and
    determine network quality obtained when the terminal accesses a network by using the Internet-accessible hotspot; and
    the display is configured to display an identifier of the Internet-accessible hotspot and an identifier that indicates the network quality, wherein the terminal determines the Internet-accessible hotspot by:
    connecting to the Wi-Fi hotspot;
    receiving a response code returned by the Wi-Fi hotspot; and
    determining, if the response code is a first response code, that the Wi-Fi hotspot is the Internet-accessible hotspot.

12. The terminal according to claim 11, wherein
    the processor is further configured to determine an authentication hotspot in the Wi-Fi hotspots that are obtained by the Wi-Fi module by scanning, wherein the authentication hotspot is a hotspot in which the terminal can normally access the Internet only by performing login authentication after being connected to the authentication hotspot.

13. A graphical user interface on a terminal, wherein the terminal comprises a Wireless Fidelity (Wi-Fi) module for scanning a Wi-Fi hotspot, a display, a memory, and at least one processor for executing an instruction stored in the memory, and the graphical user interface comprises:
    an identifier of an Internet-accessible hotspot and an identifier that indicates network quality obtained when the terminal accesses a network by using the Internet-accessible hotspot;
    in response to a determined Internet-accessible hotspot in Wi-Fi hotspots that are obtained by scanning, an identifier of the Internet-accessible hotspot is displayed; and in response to determined network quality obtained when the terminal accesses a network by using the Internet-accessible hotspot, an identifier of the network quality is displayed, wherein the terminal is configured to, in response to the determined Internet-accessible hotspot in Wi-Fi hotspots:

connect to the Wi-Fi hotspot;

receive a response code returned by the Wi-Fi hotspot; and determine, if the response code is a first response code, that the Wi-Fi hotspot is the Internet-accessible hotspot.

14. The graphical user interface according to claim 13, wherein the graphical user interface further comprises:

a network type of the Internet-accessible hotspot; and the network type of the Internet-accessible hotspot is Internet accessibility, and in response to the determined network type of the Internet-accessible hotspot, the network type of the Internet-accessible hotspot is displayed.

15. The graphical user interface according to claim 13, wherein the graphical user interface further comprises:

an identifier of an authentication hotspot and a network type of the authentication hotspot;

the network type of the authentication hotspot is login authentication required;

in response to a determined authentication hotspot in the Wi-Fi hotspots that are obtained by scanning, an identifier of the authentication hotspot is displayed; and in response to a determined network type of the authentication hotspot, the network type of the authentication hotspot is displayed.

16. The graphical user interface according to claim 13, wherein the graphical user interface further comprises:

an identifier of an Internet-inaccessible hotspot and a network type of the Internet-inaccessible hotspot;

the network type of the Internet-inaccessible hotspot is Internet inaccessibility;

in response to a determined Internet-inaccessible hotspot in the Wi-Fi hotspots obtained by scanning, an identifier of the Internet-inaccessible hotspot is displayed; and in response to a determined network type of the Internet-inaccessible hotspot, the network type of the Internet-inaccessible hotspot is displayed.

17. The graphical user interface according to claim 13, wherein the graphical user interface further comprises:

an identifier of a network congestion hotspot and a network type of the network congestion hotspot;

the network type of the network congestion hotspot is network congestion;

in response to a determined network congestion hotspot in the Wi-Fi hotspots that are obtained by scanning, an identifier of the network congestion hotspot is displayed; and in response to a determined network type of the network congestion hotspot, the network type of the network congestion hotspot is displayed.

* * * * *